US011978462B2

(12) United States Patent
Ribic

(10) Patent No.: US 11,978,462 B2
(45) Date of Patent: May 7, 2024

(54) SIMPLE CONTROL OF MANY PARAMETERS

(71) Applicant: ISUNIYE LLC, Saratoga, CA (US)

(72) Inventor: Zlatan Ribic, Vienna (AT)

(73) Assignee: ISUNIYE LLC, Saratoga, CA (US)

(*) Notice: Subject to any disclaimer, the term of this patent is extended or adjusted under 35 U.S.C. 154(b) by 0 days.

(21) Appl. No.: 16/629,547

(22) PCT Filed: Jul. 10, 2018

(86) PCT No.: PCT/AT2018/060141
§ 371 (c)(1),
(2) Date: Jan. 8, 2020

(87) PCT Pub. No.: WO2019/010511
PCT Pub. Date: Jan. 17, 2019

(65) Prior Publication Data
US 2020/0227056 A1 Jul. 16, 2020

(30) Foreign Application Priority Data
Jul. 10, 2017 (AT) .............................. A 50569/2017

(51) Int. Cl.
*G10L 19/02* (2013.01)

(52) U.S. Cl.
CPC ................................ *G10L 19/0204* (2013.01)

(58) Field of Classification Search
CPC .................................................. G10L 19/0204
(Continued)

(56) References Cited

U.S. PATENT DOCUMENTS 8,045,739 B2 * 10/2011 Paludan-Mueller ......................... H04R 25/356 381/321
9,525,950 B2 * 12/2016 Andersen .............. H04R 25/70
(Continued)

OTHER PUBLICATIONS

Brennan R et al, "A flexible filterbank structure for extensive signal manipulations in digital hearing aids", Circuits and Systems, 1998. ISCAS '98. Proceedings of the 1998 IEEE In ternational Symposium on Monterey, CA, USA May 31-Jun. 3, 1998, New York, NY, USA,IEEE, US, vol. 6, May 31, 1998 (May 31, 1998), p. 569-572, XP010289846 https://www.doi.org/10.1109/ISCAS.1998.705338.
(Continued)

*Primary Examiner* — Pierre Louis Desir
*Assistant Examiner* — Nicole A K Schmieder
(74) *Attorney, Agent, or Firm* — Dykema Gossett PLLC

(57) ABSTRACT

Various aspects of the present disclosure are directed to a process for modifying an audio signal. For example, one process for modifying an audio signal is disclosed including the following steps: determining a compression parameter of the audio signal that should be modified; fractionizing the audio signal into different frequency bands; obtaining the values of the compression parameter for each frequency band; and compressing at least a part of the frequency bands as a function of the determined compression parameter. Various other embodiments of the present disclosure are directed to a device for modifying an audio signal. In one embodiment, a device is disclosed including at least one fractionizing unit for fractionizing an incoming audio signal into different frequency bands, a plurality of compression units for compression of at least a part of the frequency bands depending on a determined compression parameter and a control unit for determining the values of a compression parameter and using a single control parameter as input value.

8 Claims, 2 Drawing Sheets

(58) Field of Classification Search
USPC .......................................................... 704/500
See application file for complete search history.

(56) References Cited

U.S. PATENT DOCUMENTS

| | | | | |
|---|---|---|---|---|
| 2011/0150256 | A1 | 6/2011 | Baechler et al. | |
| 2011/0200214 | A1 * | 8/2011 | Knox | H04R 25/50 381/314 |
| 2013/0223662 | A1 | 8/2013 | Schmitt et al. | |
| 2013/0308806 | A1 | 11/2013 | Sohn et al. | |

OTHER PUBLICATIONS

Schneider T et al, "A multichannel compression strategy for a digital hearing aid", IEEE International Conference on Acoustics, Speech, and Signal Processing, 1997. ICASSP-97, Munich, Germany Apr. 21-24, Los Alamitos, CA, USA,IEEE Comput. Soc; US, US, vol. 1, Apr. 21, 1997 (Apr. 21, 1997), p. 411-414, XP010226222.

* cited by examiner

SIMPLE CONTROL OF MANY PARAMETERS

CROSS-REFERENCE TO RELATED APPLICATIONS

This application is a national stage filing based upon International PCT Application No. PCT/AT2018/060141, filed 10 Jul. 2018, which claims priority to Austria application No. A 50569/2017, filed 10 Jul. 2017.

BACKGROUND

The present invention relates to a process for modifying an audio signal that comprises the following steps:

a. Determining a compression parameter of the audio signal that should be modified;
b. Fractionizing the audio signal into different frequency bands;
c. Obtaining the values of the compression parameters for each frequency band;
d. Compressing at least a part of the frequency bands as a function of the determined compression parameter.

The invention also relates to a device for modifying an audio signal comprising at least one fractionizing unit for fractionizing an incoming audio signal into different frequency bands, a plurality of compression units for compressing at least a part of the frequency bands as a function of a determined compression parameter and a control unit for determining the values of the compression parameter by means of a specific I/O function for each frequency band and using a single control parameter as input value.

In many fields of the economy and industry, audio signals have to be modified in order to fit specific applications. Especially hearing aid devices amplify and alter audio signals in order to improve perception by hearing-impaired individuals and increase their understanding of spoken words. Most modern instruments use multichannel compression with at least one compression parameter per channel, e.g. compression ratio, time constants (or variables), gain, etc. Even if only a few channels with different frequency bands are used, a large amount of adjustable parameters can be defined. Many users of such hearing devices are unable to understand all technical details of all adjustments available and are overwhelmed by the task of adjusting it fast in a good manner. Even experts in the field of audio signal modification often have difficulties finding the right adjustment due to the large amount of possible parameters to be modified.

SUMMARY OF THE INVENTION

Therefore it is an object of the invention to simplify the process of adjusting the modification of the audio signal.

According to the invention, this objective is achieved by the process according to claim 1 or by the device according to claim 6.

By using a single control parameter for all frequency bands, the adjustment of this control parameter can alter all values of the compression parameter of the bands. This means that the compression of different frequency bands can be altered in a different way by only changing one control parameter. This simplifies the modification of the audio signal significantly and can also be done by a layman without any knowledge of signal modification. The exact extent of this adjustment is determined by I/O functions (Input-Output functions) of the frequency bands. Each I/O function can have a different form and determines the manner of compression made for a specific frequency band.

The value of the control parameter can be adjusted in steps or continuously, depending on the embodiment. It can be easier for the user if an embodiment is provided that offers for example only 10 different values for the control parameter to simplify the adjustment.

The compression parameter selected can be any parameter that alters the manner of compression or that relates to compression, like for example the amplitude range that is compressed. Normally, the compression takes place in a certain amplitude range, while outside of this amplitude range a different modification is made. For example, louder sounds with higher amplitudes may be amplified linearly or very high amplitudes may even be reduced, and lower sounds may be damped in order to inhibit amplifying of unwanted signals. But also, the audio signal can be compressed within two or more different amplitude ranges, and the compression characteristics can differ in between these ranges.

In a preferred embodiment, a characteristic gain of the compression is chosen as the compression parameter. This characteristic gain can be the gain that is set in the range of compression if it is a linear gain, or it can, for example be the mean gain of the amplitude range in which the compression is performed. Another characteristic gain can be the gain at an amplitude where the gain changes from one linear phase to another linear phase. In this case, it can be advantageous if not the absolute gain is used but the change of gain is used as compression parameter. It can also be advantageous to use the gain at the amplitude where the compression stops or begins.

In an alternative embodiment, the compression parameter is a characteristic amplitude in which the gain changes. This could be an amplitude where the compression stops and an amplitude range with linear gain or no gain begins, or the amplitude where the gain of the compression changes could also be a good choice of compression parameter, as these amplitudes mark a significant change in the way the signal is amplified. But it shall be noted that apart from certain amplitudes or gains many other compression parameters can be chosen, for example the curvature of the compression curve or the magnitude of a jump in the curve.

In a further embodiment of the invention, for every value of the control parameter the value of the compression parameter of a frequency band is higher than or the same as the values of the compression parameter of all frequency bands covering lower frequencies. As hearing loss normally starts with having problems noticing high frequencies before experiencing problems with lower frequencies, this is preferred, as the values of the compression parameter of the frequency bands change in an ascending manner depending on the frequencies covered by the frequency band. It can be especially beneficial if at lower values of the control parameter the values of the compression parameter of some lower frequencies are set to a minimum while only the values of the compression parameter of some frequency bands covering higher frequencies are altered by changing between these low values of the control parameter. Also, or in addition to this it can be beneficial to set the values of the compression parameter of frequency bands covering high frequencies to a maximum when high values of the control parameter are set and only the values of the compression parameter of some frequency bands covering lower frequencies are altered by changing between these high values of the control parameter. This can be determined by adjusting the I/O functions of the frequency bands.

If two possible compression parameters should be modified in a simple way it can be advantageous if the values of two compression parameters are obtained by using two control parameters. In that case the audio signal can be modified by changing two different compression parameters to different extents depending on the frequency bands, but the modification can still be made quickly without difficulty or professional knowledge. Of course, the values of three or more compression parameters can be obtained by using three or more control parameters, although an increasing number of control parameters means an increasing number of possibilities at modifying the audio signal. Therefore the number should be chosen depending on the knowledge of the user and the circumstances the process is used in.

The objective can also be solved by a device previously described in which the control unit controls all compression units. The control unit can receive the single control parameter from a switch with various settings. There can be a specified number of settings or an infinite number. Depending on the setting, the control parameter can be chosen by a user. This one control parameter then sets the values of the compression parameter of all compression units by their specific I/O functions and transmits them to the respective compression units. Therefore the user can modify the audio signal significantly and to different extents within different frequency bands by setting just one switch.

DETAILED DESCRIPTION

Figure 1:
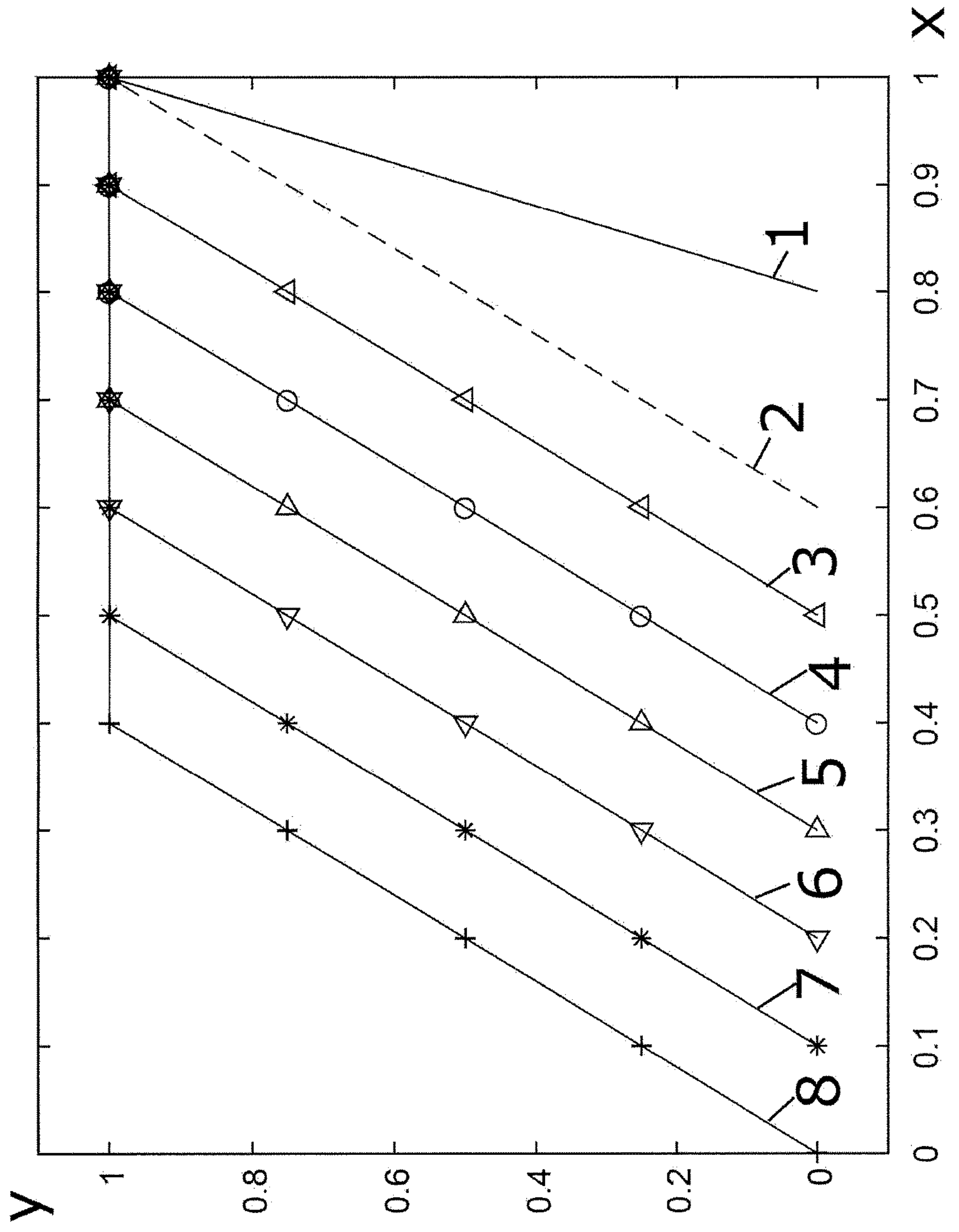
FIG. 1 is a graphic illustrating the I/O functions of an embodiment of the invention.

FIG. 1 shows I/O functions of a preferred embodiment. An inputted audio signal is fractionized into eight frequency bands, therefore eight I/O functions 1-8 are shown. The I/O functions 1-8 have essentially the same form but are shifted relative to each other along the x-axis that represents the value of the control parameter x. The frequency bands are distributed over the frequency spectrum of the audio signal that is hearable for individuals with normal hearing abilities so that the first frequency spectrum covers the lowest hearable frequencies and the eighth frequency band covers the highest hearable frequencies. In a preferred embodiment, the frequency bands are set to cover all frequencies within the hearable frequency spectrum, therefore they can overlap with each other. The scope of the frequency bands can be chosen differently. For each frequency band a I/O function is assigned, whereby the first I/O function 1 is assigned to the first frequency band, the second I/O function 2 to the second frequency band and so on. The I/O functions 1-8 shown define the values of the compression parameter y as a function of control parameter x. In the shown embodiment, the control parameter x can only be chosen among eleven different values, ranging between 0 and 1. At the value 0 of the control parameter x, the determined values of the compression parameter y are determined by the I/O functions 1-8 and in this case are 0 for all I/O functions 1-8. This marks a default setting, where the compression is done in the same way on a basic level for all frequencies. If the value of the control parameter x is changed, for example to 0.4, the value of the compression parameter y of the eighth frequency band is already at the maximum, 1, as determined by I/O function 8. At the same time, the value of the compression parameter y of the seventh frequency band is only at 0.8 while the values of the compression parameter y of the third, second and first frequency bands are still 0.

Figure 2:
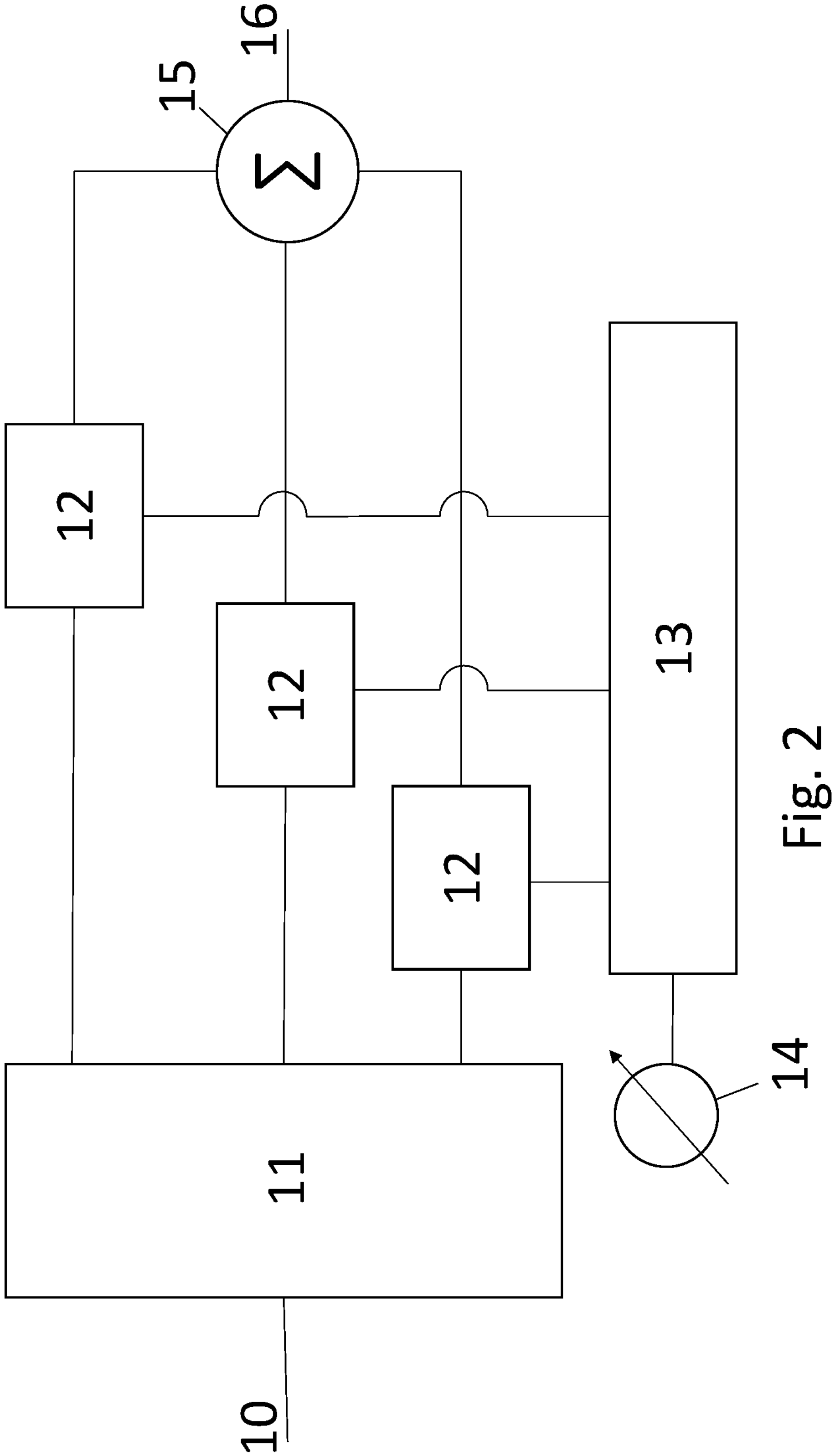
FIG. 2 is a schematic diagram of an embodiment of the invention.

FIG. 2 shows a preferred embodiment of a device according to the invention in a schematic block diagram. A fractionizing unit 11, e.g. a filter, receives an incoming audio signal via an input 10 and fractionizes the audio signal into three frequency bands. Each of these frequency bands is sent to one of three compression units 12. A control unit 13 is connected to a switch 14 that has different settings and determines the value of a control parameter x as a function of the setting. A user can change the setting of the switch and thereby modify the control parameter x. Using the inputted value of the control parameter x the control unit 13 calculates three different values of a compression parameter y, based on three I/O functions, and sends them to the compression units 12. Each compression unit 12 compresses the frequency band provided to it by using the incoming value of the compression parameter y to determine the manner of the compression. Thus every frequency band can be modified in a different way but just setting one single switch 14. The modified frequency bands are summed up via a summing device 15 thus providing the modified audio signal at output 16.

The invention claimed is:

1. A process for modifying an audio signal that comprises the following steps:

determining a compression parameter of the audio signal;

fractionizing the audio signal into different frequency bands;

obtaining values of the compression parameter for each of the frequency bands;

compressing one or more of the frequency bands as a function of the determined compression parameter in the amplitude domain; and wherein the values of the compression parameter are obtained by I/O functions for each frequency band, where the I/O functions use a single control parameter for all of the frequency bands as an input value, and wherein adjustment of the single control parameter alters values of the compression parameter for each of the frequency bands;

wherein for every value of the single control parameter, the value of the compression parameter of a frequency band is equal to or greater than the values of the compression parameters of all frequency bands covering lower frequencies; and wherein the compression parameter is an amplification of the audio signal where a gain value depends on an amplitude, so that within each of the selected frequency bands a compression is performed and higher amplitudes within a frequency band are amplified differently than lower amplitudes within the same frequency band, and wherein for at least one value of the control parameter, the value of the compression parameter of at least one frequency band is at a maximum and the value of the compression parameter of at least one other frequency band is at a minimum.

2. The process of claim 1, wherein the compression parameter is a characteristic gain of a compression of the audio signal.

3. The process of claim 1, wherein the compression parameter is a characteristic amplitude at which a gain of the audio signal changes.

4. The process of claim 1, wherein the values of two compression parameters are obtained by using two control parameters as the input value.

5. The process of claim 1, wherein for a minimum value of the control parameter the values of all compression parameters are according to the I/O functions at a minimum value and at a maximum value of the control parameter the values of all compression parameters are according to the I/O functions at a maximum.

6. The process of claim 1, wherein the compression includes a nonlinear amplification.

7. The process of claim 1, wherein an extent of the adjustment of the control parameter is determined by the I/O functions for each frequency band.

8. The process of claim 7, wherein each I/O function has a different form and determines a manner of compression made for a specific frequency band.

* * * * *